United States Patent
Das et al.

(10) Patent No.: US 9,910,728 B2
(45) Date of Patent: Mar. 6, 2018

(54) METHOD AND APPARATUS FOR PARTIAL CACHE LINE SPARING

(71) Applicant: INTEL CORPORATION, Santa Clara, CA (US)

(72) Inventors: Debaleena Das, Los Gatos, CA (US); Rajat Agarwal, Beaverton, OR (US); Brian S. Morris, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 39 days.

(21) Appl. No.: 14/757,905

(22) Filed: Dec. 23, 2015

(65) Prior Publication Data

US 2017/0185473 A1  Jun. 29, 2017

(51) Int. Cl.
| | | |
|---|---|---|
| *G06F 11/00* | (2006.01) | |
| *G06F 11/07* | (2006.01) | |
| *G06F 3/06* | (2006.01) | |

(52) U.S. Cl.
CPC ........ *G06F 11/0793* (2013.01); *G06F 3/0619* (2013.01); *G06F 3/0659* (2013.01); *G06F 3/0673* (2013.01); *G06F 11/073* (2013.01); *G06F 11/0751* (2013.01)

(58) Field of Classification Search
CPC .. G06F 11/0793; G06F 11/073; G06F 3/0673; G06F 3/0619; G06F 3/0659; G06F 11/0751
See application file for complete search history.

(56) References Cited

U.S. PATENT DOCUMENTS

| | | |
|---|---|---|
| 7,007,210 B2 | 2/2006 | Fields, Jr. et al. |
| 2009/0031078 A1 | 1/2009 | Warnes et al. |
| 2010/0131812 A1* | 5/2010 | Mohammad ........... G11C 29/44 714/723 |
| 2011/0099419 A1 | 4/2011 | Lucas et al. |
| 2012/0254656 A1 | 10/2012 | Schock |
| 2013/0246868 A1* | 9/2013 | Takagi .................. G06F 11/073 714/719 |
| 2013/0254506 A1 | 9/2013 | Berke et al. |
| 2015/0347254 A1* | 12/2015 | Jones .................. G06F 11/2094 714/6.13 |

FOREIGN PATENT DOCUMENTS

| | | |
|---|---|---|
| WO | 2015/088476 | 6/2015 |
| WO | 2015133982 | 9/2015 |

OTHER PUBLICATIONS

Alchesky, L.C., "Single-Bit-Errors: A Memory Module Supplier's Perspective on Cause, Impact and Detection", [online], [Retrieved on Dec. 2, 2015], Retrieved from the Internet at <URL: http://www.smartm.com/files/salesLiterature/dram/smart_whitepaper_sbe.pdf>, 13 pages.

(Continued)

*Primary Examiner* — Thien D Nguyen
(74) *Attorney, Agent, or Firm* — Konrad Raynes Davda & Victor LLP; David W. Victor (57) ABSTRACT

Provided are an apparatus and method to store data from a cache line at locations having errors in a sparing directory. In response to a write operation having write data for locations in one of the cache lines, the write data for a location in the cache line having an error is written to an entry in a sparing directory including an address of the cache line.

25 Claims, 5 Drawing Sheets

(56) References Cited

OTHER PUBLICATIONS

JEDEC, "DDR4 SDRAM", JEDEC Standard, JESD79-4, Sep. 2012, 214 pp.
JEDEC, "Double Data Rate (DDR) SDRAM Specification", JEDEC Standard, JESD79C, Mar. 2003, 82 pp.
JEDEC, "High Bandwidth Memory (HBM) DRAM", JEDEC Standard, JESD235, Oct. 2013, 124 pp.
JEDEC, "Low Power Double Data Rate 3 (LPDDR3)", JEDEC Standard, JESD209-3C, Aug. 2015, 158 pp.
JEDEC, "Low Power Double Data Rate 4 (LPDDR4)", JEDEC Standard, JESD209-4, Aug. 2014, 196 pp.
JEDEC, "Wide I/O 2 (WideIO2)", JEDEC Standard, JESD229-2, Aug. 2014, 116 pp. [Submitted as Parts A, B, and C due to EFS-Web file size restrictions].
Schroeder, B., et al., "DRAM Errors in the Wild: A Large-Scale Field Study", Proceedings of the Eleventh International Joint Conference on Measurement and Modeling of Computer Systems, Jun. 2009, 12 pp.
International Search Report and Written Opinion for International Application No. PCT/US2016/063425, dated Mar. 31, 2017, 14 pp. [77.334PCT (ISR & WO)].

\* cited by examiner

FIG. 1

Cache Line

FIG. 2

Sparing Directory Entry

FIG. 7

METHOD AND APPARATUS FOR PARTIAL CACHE LINE SPARING

TECHNICAL FIELD

Embodiments described herein generally relate to an apparatus and method for partial cache line sparing.

BACKGROUND

In Dynamic Random Access Memory (DRAM) systems, both hard and soft errors may occur in the bits of the DRAM. Hard errors corrupt bits in a repeatable manner and concern physical damage to the memory cells whereas soft errors comprise random corrupt bits that may be corrected using an error correction algorithm and parity data for the cache line including a defective bit.

To avoid hard errors, sparing techniques may be used to replace sections of the memory dies having the errors with other spare memory dies not having errors. With row sparing, if a manufacturer or operating system during operations discovers a row of the DRAM having a defect (one or more defective bits), a fuse in the DRAM may be blown to map a spare row into the array to replace the defective row and map the defective row out of the memory array.

A rank sparing technique may replace a rank of DRAM devices, i.e., the physical chips, having a hard error with a spare rank on the DRAM. A memory rank is a set of DRAM chips connected to the same chip select signal that are accessed simultaneously and share command and control signals.

There is a need in the art for improved sparing techniques.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Current studies indicate that around 50% of hard error failures in a DRAM are single bit fails. Thus, performing row and rank sparing involves replacing many good bits. Described embodiments provide a technique for partial cache line sparing that performs sparing with respect to a small unit of bits in the cache line that includes the failed single bit, such as a nibble of bits (4 bits) in the cache line having the failed bit. In this way, the sparing focuses the replacement on those specific bits experiencing the hard bit error. Thus, the sparing only affects the cache line having the single bit failure and within the cache line only a subset of the bits including the single bit failure. Limiting the sparing to a small area of the cache line, such as a nibble, avoids the need to replace large regions of the memory that do not have errors, such as occurs with row and rank sparing.

With described embodiments, in response to a write operation having write data for locations in one of the cache lines, write data for a location in the cache line having the hard error, such as a nibble of bits or some subset of a data unit, e.g., a byte (8 bits), is stored in an entry in a sparing directory including an address of the cache line. In certain embodiments, the sparing directory may be stored in a memory controller of the DRAM, where the controller may be embedded in the DRAM or separate from the DRAM. In this way, one or more failed bits may be replaced with bits that are stored in the memory controller, thus avoiding the need to replace a larger area of the memory, such as a row or rank, that may have mostly good bits.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
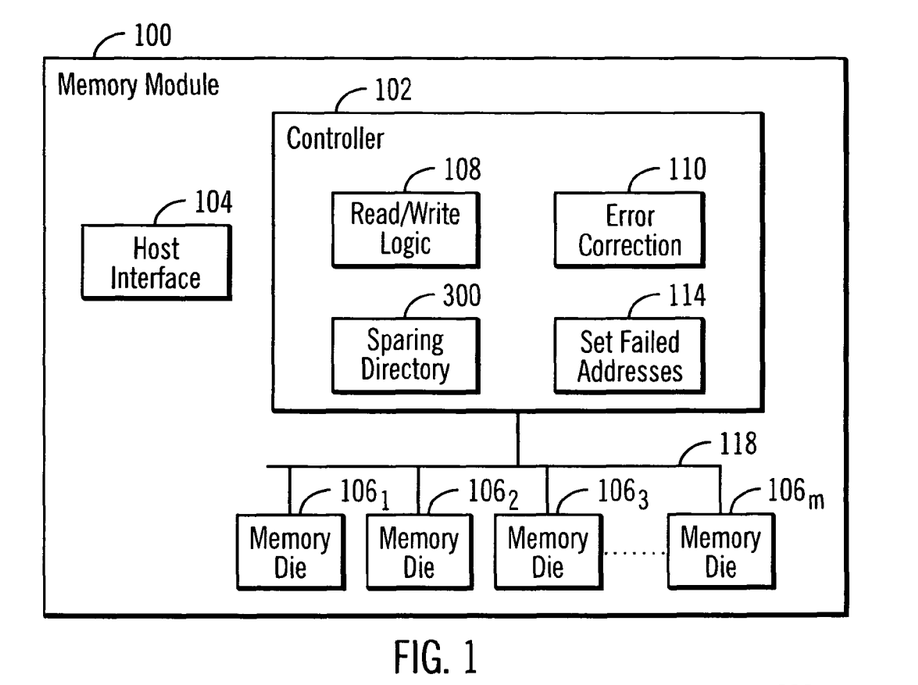
FIG. 1 illustrates an embodiment of a memory module.

FIG. 1 illustrates an embodiment of a memory module 100 including a memory controller 102, a host interface 104 to interface with a host system, and a plurality of memory dies $106_1$, $106_2$ ... $106_m$ comprising the storage elements that store data in cache lines at addressable locations. The controller 102 includes a read/write logic 108 to process read and write operations directed to cache lines in memory dies $106_1$, $106_2$ ... $106_m$ and an error correction unit 110 to perform error correction operations using parity data and error correction codes. The controller 102 may further store a sparing directory 300 includes entries storing data for locations in the cache lines that have bit errors, such as hard bit errors. A hard bit error comprises an error which corrupts bits in a repeatable manner because of a physical defect to the memory cells, whereas a soft error comprises randomly corrupt bits in the memory that may be corrected by error correction operations using parity data. The controller 102 further maintains a set of failed addresses 114 comprising addresses of cache lines in the memory dies $106_1$, $106_2$ ... $106_m$ that have hard bit errors for which data is stored in the sparing directory 300.

The memory controller 102 interfaces with the memory dies $106_1$, $106_2$ ... $106_m$ over a memory interface 118.

In FIG. 1 the sparing directory 300 and set failed addresses 114 are shown as stored in the controller 102 of the memory module 100. In an alternative embodiment, the sparing directory 300 and/or the set failed addresses 114 may be stored in the memory dies $106_1$, $106_2$ ... $106_m$.

The memory subsystem 100 and memory dies $106_1$, $106_2$ ... $106_m$ may implement a type of Dynamic Random Access Memories (DRAMs). In one embodiment, the memory module 100 may comprise Dual In-Line Memory Modules (DIMMs), such as unbufferred DIMMs (UDIMM), Load Reduced Dual-inline Memory Module (LRDIMM), a Small Outline Dual In-line Memory Module (SODIMM), etc. The memory module 100 may implement various forms of non-volatile memory, including, but not limited to, NAND (flash) memory, ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, etc. In one embodiment, the memory module 100 may comprise non-volatile memory devices, such as a Non-Volatile Dual In-line Memory Module (NVDIMM).

The memory module 100 described herein may be compatible with a number of volatile memory technologies, such as DDR3 (Dual Data Rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such specifications.

Although embodiments are described for a memory device, such as a DIMM, the described embodiments may be implemented in an in-package memory (IPM), such as a system-on-a chip (SOC) and other IPMs including a memory within the package.

Figure 2:
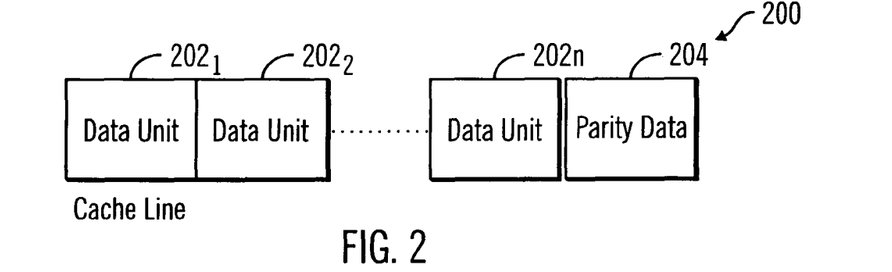
FIG. 2 illustrates an embodiment of a cache line.

FIG. 2 illustrates an embodiment of a cache line 200 as including a plurality of data units $202_1$, $202_2$ ... $202_n$, such as bytes or words and parity data 204 providing parity data for the data units $202_1$, $202_2$ ... $202_n$ to allow error correction of soft bit errors in the data units $202_1$, $202_2$ ... $202_n$. For instance, the data units $202_1$, $202_2$ ... $202_n$ may comprise eight bytes each to form a 64 byte cache line 200.

Figure 3:
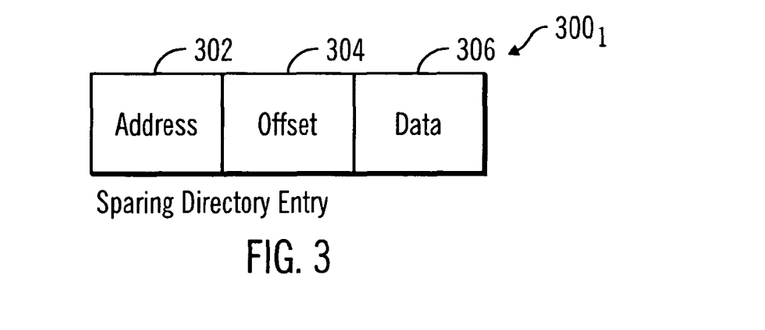
FIG. 3 illustrates an embodiment of a sparing directory entry.

FIG. 3 illustrates an embodiment of an entry $300_i$ in the sparing directory 300 including an address 302 of the cache line 200 having the hard bit error; an offset 304 in the cache line 200 having the error; and data 306 for the location at the offset 304 having the hard error. In one embodiment, the location having the error at the offset 304 may identify a sub-unit of bits within a data unit $202_i$, where the offset 304 identifies the location of the sub unit within the cache line 200. For instance, if the data units comprise bytes, than the offset 304 may indicate a location of the data 306 to store, such as a nibble, i.e., four bits, within one of the bytes. In an alternative embodiment, the sub-units stored in the data 306 of the entry $300_i$ may comprise other subsets of bits in a data unit $202_i$, such as the entire data unit, other sub-unit of bits, or just one bit.

For instance, by way of example, if the cache line has 64 bytes, and the locations comprise nibbles within each byte, then the offset may have 7 bits to identify the offset of any one of the 128 nibbles and one bit identifies the offset of error correction code (ECC) bits 204. Thus, the offset 304 may identify all the possible sub-units of data in the cache line 200 that may be stored in the sparing directory entry 306.

Figure 4:
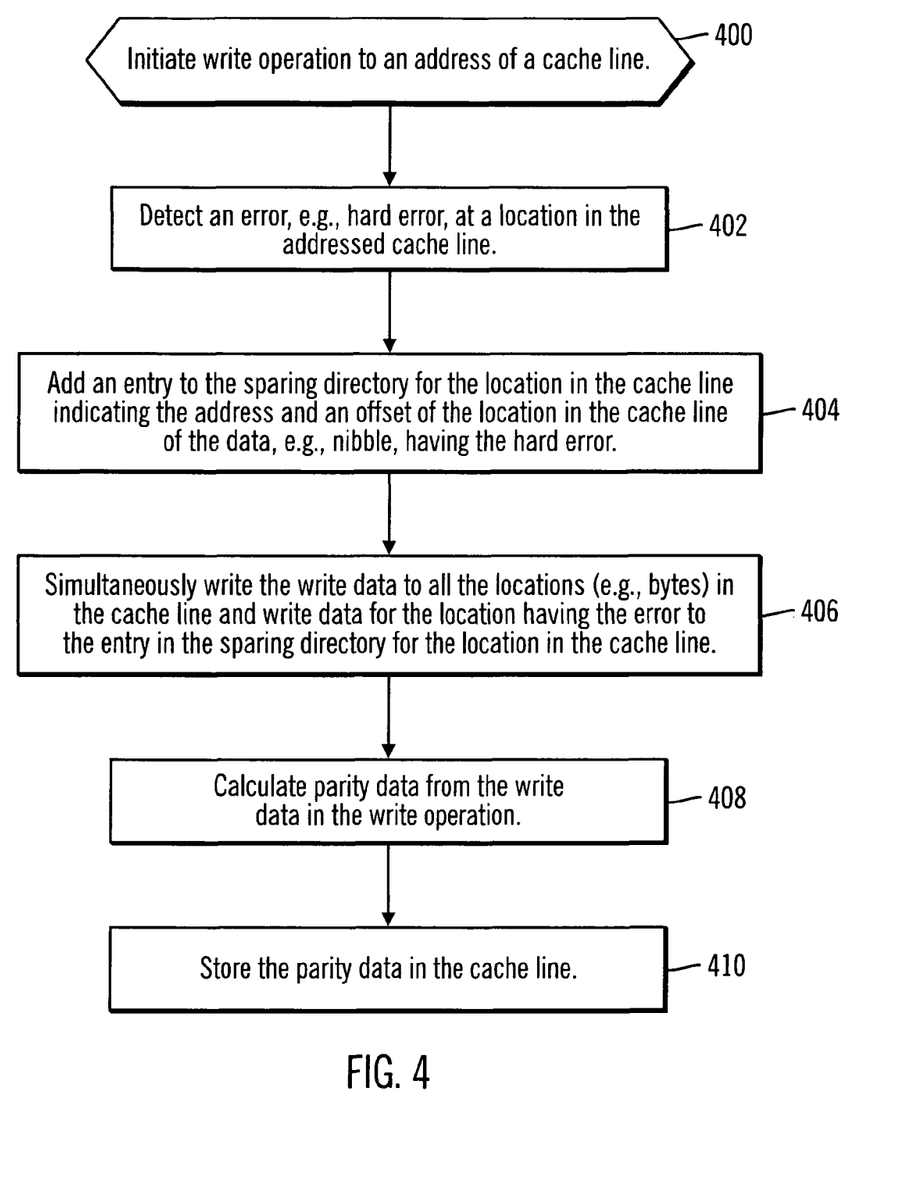
FIG. 4 illustrates an embodiment of a read operation.

FIG. 4 illustrates an embodiment of operations performed by the read/write logic 108 to write data to an address of a cache line 200. Upon initiating (at block 400) the write operation, the read/write logic 108 detects (at block 402) an error, such as a hard error, at a location in the addressed cache line 200. The error may be detected while the read/write logic 108 is performing the write operation and detects an error when performing error correction 110. In one embodiment, the hard error in the cache line 200 may be detected by the error correction logic 110, which may detect an error while performing error correction on the cache line 200 and report the failure to firmware in the memory controller 102, which analyzes the error to determine whether there is a hard bit failure. In an alternative embodiment, the cache lines 200 having hard bit errors may have been previously determined, such as during previous operations or during manufacture and testing, and such hard bit errors are indicated in the set failed addresses 114.

Upon detecting the error at the location in the cache line 200, the read/write logic 108 adds (at block 404) an entry $300_i$ to the sparing directory 300 for the location in the cache line 200 indicating the address 302 and an offset 304 of the location in the cache line 200, such as the location of the nibble having the hard bit error. The read/write logic 108 may simultaneously write (at block 406) the write data to all the locations (e.g., bytes) in the cache line 200 and write data for the location, e.g., nibble, having the error to the entry $300_i$ in the sparing directory 300 for the location in the cache line 200. The error correction unit 110 may calculate (at block 408) parity data 204 from the write data in the write operation and store (at block 410) the parity data 204 in the cache line 200. The parity data 204 may be written while the write data is written to the data units $202_1$, $202_2$ ... $202_n$.

Figure 5:
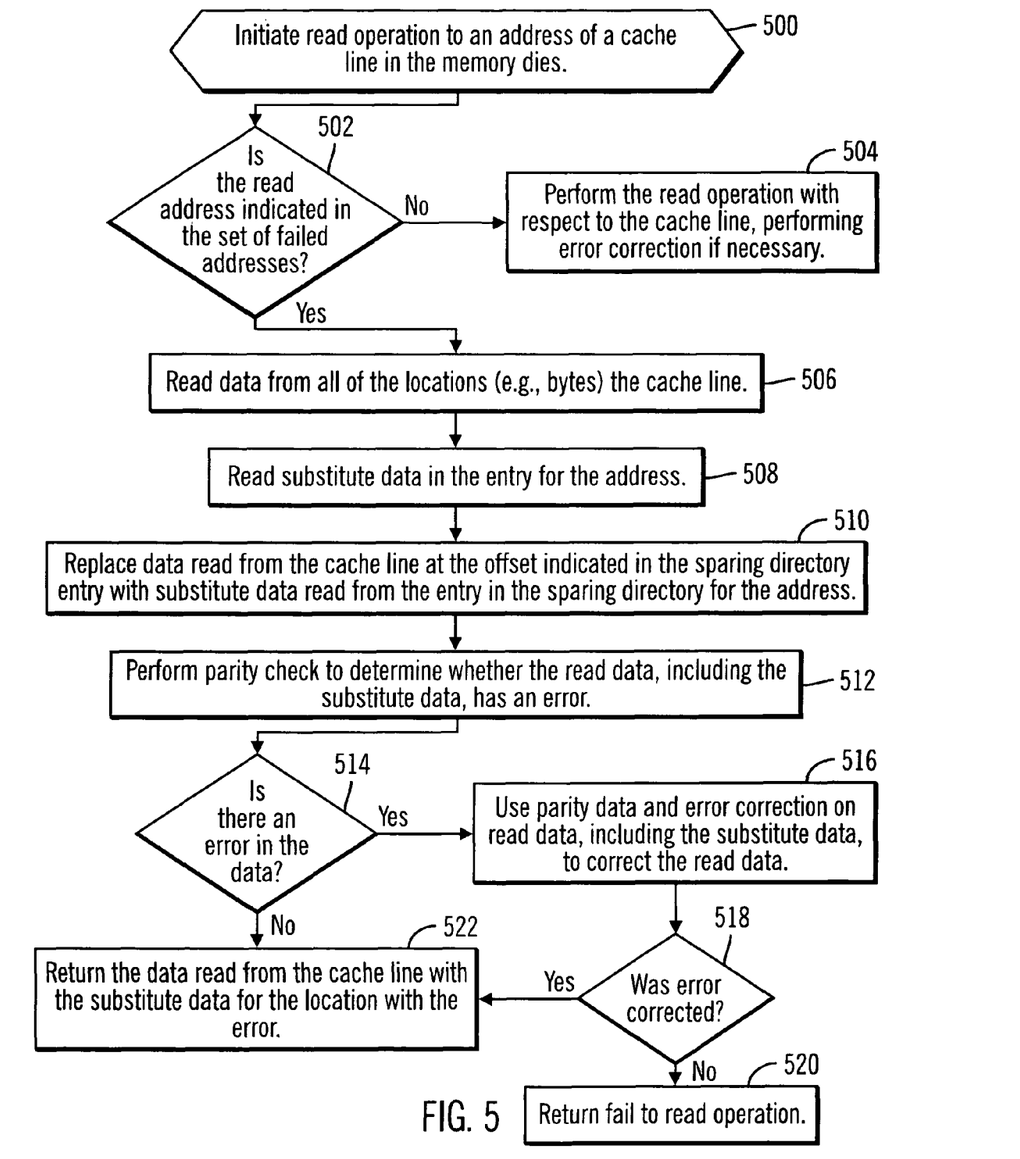
FIG. 5 illustrates an embodiment of a write operation.

FIG. 5 illustrates an embodiment of operations performed by the read/write logic 108 for a read operation to an address of a cache line 200 in the memory dies $106_1$, $106_2$ ... $106_m$. Upon initiating (at block 500) the read operation, if (at block 502) the read address is not indicated in the set of failed address 114, then the read/write logic 108 performs (at block 504) the read operation with respect to the addressed cache line 200, performing error correction if necessary. If (at block 502) the read address is indicated in the set failed addresses 114, then the data $202_i$, $202_2$ ... $202_n$ is read (at block 506) from the locations in the cache line 200. Substitute data 306 in the entry $300_i$ for the read address, as indicated in field 302, is read (at block 508) from the sparing directory entry $300_i$. The data read from the location in the cache line 200 at the offset 304 indicated in the sparing directory entry $300_i$, which includes the hard bit error, is replaced (at block 510) with the substitute data 306 from the entry $300_n$ in the sparing directory 300.

The error correction 110 may perform (at block 512) a parity check using the parity data 204 to determine whether the read data, including the substitute data 306, has an error, e.g., soft error. If (at block 514) there is an error, then the error correction 110 uses (at block 516) the parity data 204 and an error correction algorithm on the read data, including the substitute data 306, to correct the read data. If (at block 518) the error was not corrected, the read is failed (at block 520). If (at block 514) there is no error in the data or if (at block 518) the error was corrected, then the data read from the cache line $200_i$ with the substitute data 306 for the location with the hard error is returned (at block 522) to the read operation.

Figure 6:
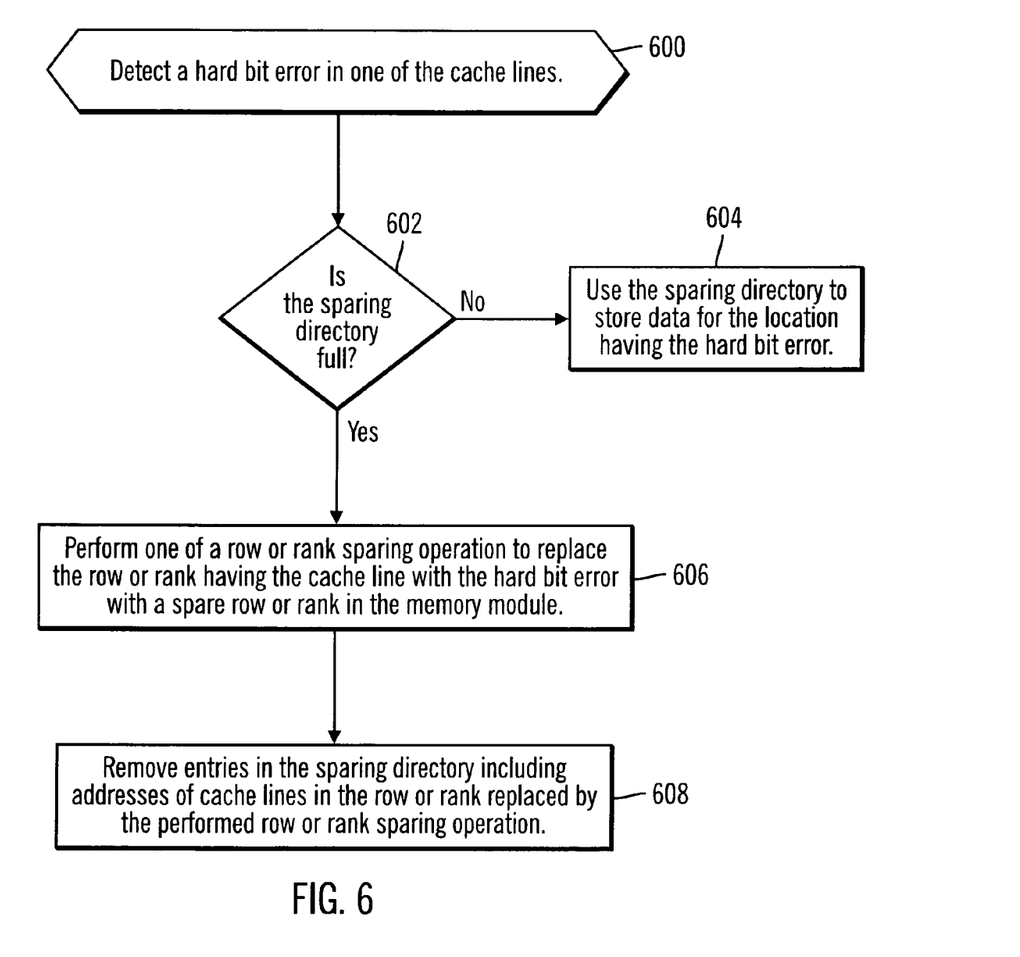
FIG. 6 illustrates an embodiment of operations to perform row or rank sparing.

FIG. 6 illustrates an embodiment of operations performed by the controller 104 to perform an additional sparing operation, such as row or rank sparing, if a hard bit error is detected when the sparing directory 300 has reached a maximum number of entries. Upon (at block 600) detecting a hard bit error in one of the cache lines 200, such as during the write operation described with respect to FIG. 4, if (at block 602) the sparing directory 300 is not full, i.e., has not reached a maximum number of entries, then the sparing directory 300 is used (at block 604) to store the data for the location having the hard bit error, such as described with respect to FIG. 4. If (at block 602) the sparing directory 300 is full, then the controller 102 performs (at block 606) one of row or rank sparing to replace the row or rank having the cache line 200 with the hard bit error with a spare row or rank in the memory dies $106_1$, $106_2$ ... $106_m$. The entries $300_i$ in the sparing directory 300 including address of cache lines 200 in the row or rank replaced are removed (at block 608) to make room to store data for additional hard bit errors. In this way, row or rank sparing which involves replacing large sections of the memory, are avoided until the sparing directory used to handle single hard bit errors is no longer able to handle the number of single hard bit errors being experienced.

With the described embodiments, hard bit errors in the memory device are handled by storing data in a sparing directory for a limited number of bits including the bit having the error in the cache line. When the cache line is read, the data read from the location in the cache line having the bits with the error is replaced with the data for the location that is stored in the sparing directory. Thus, the read data is reconstructed from data read from portions of the cache line not having hard errors and data maintained in the sparing data for the group of bits including the hard error. This read data with substitute data from the sparing directory may then be subject to error correction to correct any further software errors in the cache line data.

Figure 7:
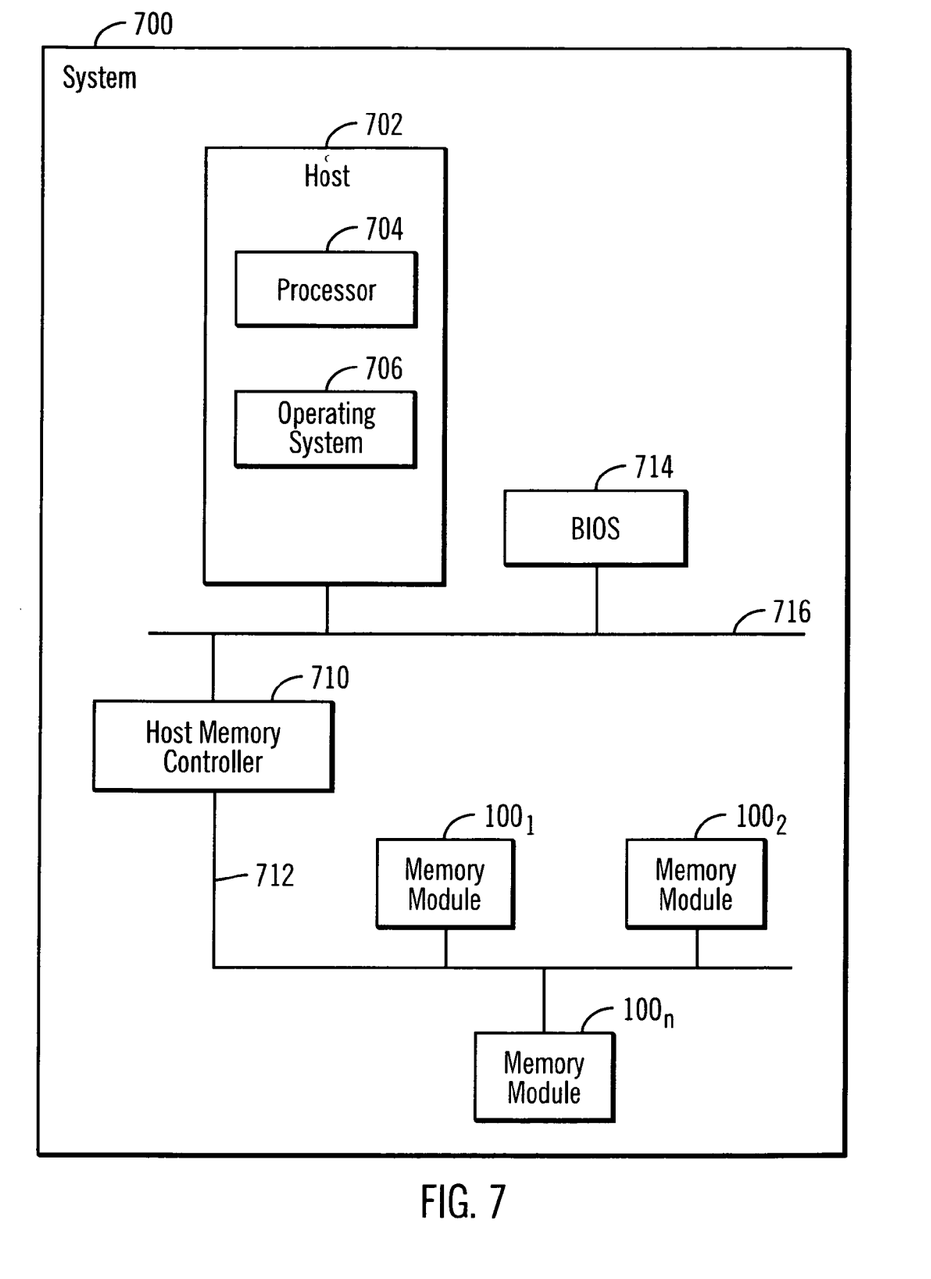
FIG. 7 illustrates an embodiment of a system having memory modules.

FIG. 7 illustrates an embodiment of a system 700 including a host 702 comprised of a processor 704 that executes an operating system 706 and a driver 708 to interface read and write requests from the operating system 706 to one or more memory modules $100_1$, $100_2$ ... $100_n$, such as the memory module 100 of FIG. 1 described above. A host memory controller 710, in response to memory access requests from the block driver 108, communicates with the memory modules $100_1$, $100_2$ ... $100_m$ over a memory bus 712, also referred to as a channel, bus interface, etc. The host memory controller 710 includes logic to manage read and write operations and memory management operations with respect to the memory modules $100_1$, $100_2$ ... $100_n$ connected to the memory bus 712.

In the embodiment of FIG. 1, the controller 102, read/write logic 108, error correction 110, and sparing directory 300 are shown as included in a controller 102 within a memory module 100. In an alternative embodiment, the controller 102 may be implemented in a host memory controller 710 external to the memory modules $100_1$, $100_2$ ... $100_n$, such as within host memory controller 710. In such case where the controller 102 and sparing techniques are implemented external to the memory modules $100_1$, $100_2$ ... $100_n$, the host memory controller 710 may manage read/write and sparing operations with respect to multiple of the memory modules $100_1$, $100_2$ ... $100_n$.

The host 702, a Basic Input Operating System (BIOS) 714, and the host memory controller 710 may communicate over a system bus 716, such as a processor bus, fabric, ring or mesh architecture internal to the processor 704, e.g., central processing unit (CPU), Intel Corporation's KEIZER TECHNOLOGY INTERCONNECT® (KTI), an Open Core Protocol interconnect, and other types of standardized or proprietary interconnects. (Keizer Technology Interconnect is a registered trademark of Intel Corporation throughout the world). Other components may also be connected to the system bus 716, such as storage devices, and input/output devices, such as display monitors, input devices, etc. The memory modules $100_1$, $100_2$ ... $100_n$ may comprise the main memory of the host 702 used to store code and operands executed by the processor 704. The BIOS 714 may perform certain hardware initialization operations of hardware in the system 700, including initializing the host memory controller 110 and memory modules $100_1$, $100_2$ ... $100_n$. The host memory controller 710 may be integrated with the processor 104, such as a system on a chip (SOC), or implemented in logic separate from the processor 104 on the system 100 motherboard as shown in FIG. 1.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects.

This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as i, m, and n are used herein to denote a variable number of instances of an element, which may represent the same or different values, and may represent the same or different value when used with different or the same elements in different described instances.

EXAMPLES

Example 1 is an apparatus for storing data in addressable cache lines in the memory dies, comprising: a controller to perform read and write operation with respect to the memory dies, to: in response to a write operation having write data for locations in one of the cache lines, write a portion of the write data, the portion including write data for a location in the cache line having a bit error to an entry in a sparing directory in the controller, the entry including an address of the cache line.

In Example 2, the subject matter of Examples 1 and 3-12 can optionally include that the error comprises a hard error and is determined while performing error correction for the cache line.

In Example 3, the subject matter of Examples 1, 2 and 4-12 can optionally include that the controller is further to: detect the hard error while performing the write operation, wherein the writing of the data for the location in the cache line having the error is performed in response to detecting the error during the write operation.

In Example 4, the subject matter of Examples 1-3 and 5-12 can optionally include that the controller is further to: read data from the cache line having the location with the error in response to a read operation to the cache line; read substitute data for the location having the error in the cache line from the entry in the sparing directory for the cache line; replace the data with the error read at the location from the cache line with the substitute data; and returning the substitute data to the read operation.

In Example 5, the subject matter of Examples 1-4 and 6-12 can optionally include that the location in the cache line having the error comprises one of multiple locations of data in the cache line, wherein the controller is further to: write data to the locations in the cache line during the write operation; and read data for locations in the cache line, wherein the data returned to the read operation includes the data read from the cache line for locations other than the location having the error and the substitute data.

In Example 6, the subject matter of Examples 1-5 and 7-12 can optionally include that the controller is further to: determine whether the cache line is indicated as having an error in response to the read operation to the cache line, wherein the operations of reading substitute data for the location and replacing the data with the error are performed in response to determining that the cache line is indicated as having the error.

In Example 7, the subject matter of Examples 1-6 and 8-12 can optionally include that the controller is further to: perform error correction for the data read from the cache line including the substitute data in response to determining that the read data from the cache line including the substitute data includes an error; and determine whether the error correction corrected the read data from the cache line including the substitute data, wherein the data read from the cache line including the substitute data is returned in response to the error correction correcting the error.

In Example 8, the subject matter of Examples 1-7 and 9-12 can optionally include that there are multiple locations in the cache lines from which data can be stored in the sparing directory if there is an error at the locations, and wherein each of the entries in the sparing directory includes an offset into the cache line indicating the location having the error.

In Example 9, the subject matter of Examples 1-8 and 10-12 can optionally include that each of the cache lines is comprised of a plurality of bytes, and wherein the data written to the entry in the sparing directory for the location having the error comprises a subset of bits of one of the bytes in the cache line, and wherein the offset indicates the location of the subset of bits in the cache line.

In Example 10, the subject matter of Examples 1-9, 11, and 12 can optionally include that the sparing directory is within the controller and wherein the apparatus includes the memory dies.

In Example 11, the subject matter of Examples 1-10 and 12 can optionally include that the sparing directory includes a plurality of entries storing data for locations in the cache lines for which errors are detected, wherein each of the entries indicates the address of the cache line having the location with the error, an offset indicating the location in the cache line having the error, and the data for the location.

In Example 12, the subject matter of Examples 1-11 can optionally include that the controller is further to: determine a hard bit error in the cache line when the sparing directory includes a maximum number of entries for locations in the cache lines; perform a row or rank sparing operation to replace a row or rank of the memory dies including the determined hard bit error; and remove the entries from the sparing directory including addresses for cache lines in the row or rank in the memory dies replaced with the row or rank sparing.

Example 13 is a system, comprising: a host; and a host memory controller; at least one memory module coupled to the host memory controller to receive read and write requests from the host, each memory module comprising: memory dies for storing data in addressable cache lines; and a controller that performs read and write operation with respect to the memory dies, to: in response to a write operation having write data for locations in one of the cache lines, write the write data for a location in the cache line having an error to an entry in a sparing directory including an address of the cache line.

In Example 14, the subject matter of Examples 13 and 15-19 can optionally include that the controller in the memory module is further to: read data from the cache line having the location with the error in response to a read operation to the cache line; read substitute data for the location having the error in the cache line from the entry in the sparing directory for the cache line; replace the data with the error read at the location from the cache line with the substitute data; and returning the substitute data to the read operation.

In Example 15, the subject matter of Examples 13, 14, and 16-19 can optionally include that the location in the cache line having the error comprises one of multiple locations of data in the cache line, wherein the controller in the memory module is further to: write data to the locations in the cache line during the write operation; and read data for locations in the cache line, wherein the data returned to the read operation includes the data read from the cache line for locations other than the location having the error and the substitute data.

In Example 16, the subject matter of Examples 13-15 and 17-19 can optionally include that the controller in the memory module is further to: perform error correction for the data read from the cache line including the substitute data in response to determining that the read data from the cache line including the substitute data includes an error; and determine whether the error correction corrected the read data from the cache line including the substitute data, wherein the data read from the cache line including the substitute data is returned in response to the error correction correcting the error.

In Example 17, the subject matter of Examples 13-16, 18, and 19 can optionally include that there are multiple locations in the cache lines from which data can be stored in the sparing directory if there is an error at the locations, and wherein each of the entries in the sparing directory includes an offset into the cache line indicating the location having the error.

In Example 18, the subject matter of Examples 13-17, and 19 can optionally include that the sparing directory is within the controller.

In Example 19, the subject matter of Examples 13-18 can optionally include that the sparing directory includes a plurality of entries storing data for locations in the cache lines for which errors are detected, wherein each of the entries indicates the address of the cache line having the location with the error, an offset indicating the location in the cache line having the error, and the data for the location.

Example 20 is a method to perform read and write operations with respect to addressable cache lines in memory dies, comprising: in response to a write operation having write data for locations in one of the cache lines, writing the write data for a location in the cache line having an error to an entry in a sparing directory including an address of the cache line.

In Example 21, the subject matter of Example 20 can optionally include at least any one of:

(1) that the error comprises a hard error and is determined while performing error correction for the cache line; and/or (2) detecting the hard error while performing the write operation, wherein the writing of the data for the location in the cache line having the error is performed in response to detecting the error during the write operation; and/or (3) reading data from the cache line having the location with the error in response to a read operation to the cache line; reading substitute data for the location having the error in the cache line from the entry in the sparing directory for the cache line; replacing the data with the error read at the location from the cache line with the substitute data; and returning the substitute data to the read operation; and/or (4) that wherein the location in the cache line having the error comprises one of multiple locations of data in the cache line, writing data to the locations in the cache line during the write operation; and reading data for locations in the cache line, wherein the data returned to the read operation includes the data read from the cache line for locations other than the location having the error and the substitute data; and/or (5) determining whether the cache line is indicated as having an error in response to the read operation to the cache line, wherein the operations of reading substitute data for the location and replacing the data with the error are performed in response to determining that the cache line is indicated as having the error; and/or (6) performing error correction for the data read from the cache line including the substitute data in response to determining that the read data from the cache line including the substitute data includes an error; and determining whether the error correction corrected the read data from the cache line including the substitute data, wherein the data read from the cache line including the substitute data is returned in response to the error correction correcting the error; and/or (7) that there are multiple locations in the cache lines from which data can be stored in the sparing directory if there is an error at the locations, and wherein each of the entries in the sparing directory includes an offset into the cache line indicating the location having the error.

(8) that each of the cache lines is comprised of a plurality of bytes, and wherein the data written to the entry in the sparing directory for the location having the error comprises a subset of bits of one of the bytes in the cache line, and wherein the offset indicates the location of the subset of bits in the cache line; and (9) that the sparing directory is within the controller and wherein the apparatus includes the memory dies; and/or (10) that the sparing directory includes a plurality of entries storing data for locations in the cache lines for which errors are detected, wherein each of the entries indicates the address of the cache line having the location with the error, an offset indicating the location in the cache line having the error, and the data for the location; and/or (11) determining a hard bit error in the cache line when the sparing directory includes a maximum number of entries for locations in the cache lines; performing a row or rank sparing operation to replace a row or rank of the memory dies including the determined hard bit error; and removing the entries from the sparing directory including addresses for cache lines in the row or rank in the memory dies replaced with the row or rank sparing.

Example 22 is an apparatus, comprising: means for writing, in response to a write operation having write data for locations in one of the cache lines, the write data for a location in the cache line having an error to an entry in a sparing directory including an address of the cache line.

In Example 23, the subject matter of Example 22 can optionally include means for reading data from the cache line having the location with the error in response to a read operation to the cache line; means for reading substitute data for the location having the error in the cache line from the entry in the sparing directory for the cache line; means for replacing the data with the error read at the location from the cache line with the substitute data; and means for returning the substitute data to the read operation.

Example 24 is a machine-readable storage including machine-readable instructions, when executed, to implement a method or realize an apparatus or system as claimed in any preceding claim.

Example 25 is an apparatus comprising means to perform a method as claimed in any preceding claim.

What is claimed:

1. An apparatus for storing data in cache lines in memory dies, comprising:
   a controller to perform read and write operation with respect to the memory dies, to:
   in response to a write operation having write data for locations in a cache line, perform:
   detect an error at a location of the locations in the cache line;
   write the write data to the cache line; and
   write a portion of the write data, written to the location in the cache line having the error, to an entry in a sparing directory in the controller, wherein the entry in the sparing directory further includes an address of the cache line having the error.

2. The apparatus of claim 1, wherein the error comprises a hard error and is determined while performing error correction for the cache line.

3. The apparatus of claim 2, wherein the controller is further to:
   detect the hard error while performing the write operation, wherein the write data for the location in the cache line having the error is written in response to detecting the error during the write operation.

4. The apparatus of claim 1, wherein there are multiple locations in the cache lines from which data can be stored in the sparing directory if there is an error at the locations, and wherein the entry in the sparing directory includes an offset into the cache line indicating the location having the error.

5. The apparatus of claim 4, wherein each of the cache lines is comprised of a plurality of bytes, and wherein the data written to the entry in the sparing directory for the location having the error comprises a subset of bits of one of the bytes in the cache line, and wherein the offset indicates the location of the subset of bits in the cache line.

6. The apparatus of claim 1, wherein the sparing directory is within the controller and wherein the apparatus includes the memory dies.

7. The apparatus of claim 1, wherein the sparing directory includes a plurality of entries storing data for locations in the cache lines for which errors are detected, wherein each of the entries indicates the address of the cache line having the location with the error, an offset indicating the location in the cache line having the error, and the data for the location.

8. The apparatus of claim 1, wherein the controller is further to:
determine a hard bit error in the cache line when the sparing directory includes a maximum number of entries for locations in the cache lines;
perform a row or rank sparing operation to replace a row or rank of the memory dies including the determined hard bit error; and
remove the entries from the sparing directory including addresses for cache lines in the row or rank in the memory dies replaced with the row or rank sparing.

9. An apparatus for storing data in cache lines in memory dies, comprising:
a controller to perform read and write operation with respect to the memory dies, to:
in response to a write operation having write data for locations in one of the cache lines, write the write data for a location in the cache line having an error to an entry in a sparing directory in the controller, the entry including an address of the cache line;
read data from the cache line having the location with the error in response to a read operation to the cache line;
read substitute data for the location having the error in the cache line from the entry in the sparing directory for the cache line;
replace the data read at the location in the cache line having the error with the substitute data; and
return the substitute data to the read operation.

10. The apparatus of claim 9, wherein the controller is further to:
write data to the locations in the cache line during the write operation; and
read data for locations in the cache line, wherein the data returned to the read operation includes the data read from the cache line for locations other than the location having the error and the substitute data.

11. The apparatus of claim 9, wherein the controller is further to:
determine whether the cache line is indicated as having an error in response to the read operation to the cache line, wherein the reading substitute data for the location having the error and replacing the data with the error are performed in response to determining that the cache line is indicated as having the error.

12. The apparatus of claim 9, wherein the controller is further to:
perform error correction for the data read from the cache line including the substitute data in response to determining that the read data from the cache line including the substitute data includes an error; and
determine whether the error correction corrected the read data from the cache line including the substitute data, wherein the data read from the cache line including the substitute data is returned in response to the error correction correcting the error.

13. A system, comprising:
a host;
a host memory controller; and
at least one memory module coupled to the host memory controller to receive read and write requests from the host, each memory module comprising:
memory dies for storing data in cache lines; and
a controller that performs read and write operation with respect to the memory dies, to:
in response to a write operation having write data for locations in a cache line, perform:
detect an error at a location of the locations in the cache line;
write the write data to the cache line; and
write a portion of the write data written to the location in the cache line having the error to an entry in a sparing directory,
wherein the entry in the sparing directory further includes an address of the cache line having the error.

14. The system of claim 13, wherein there are multiple locations in the cache lines from which data can be stored in the sparing directory if there is an error at the locations, and wherein the entry in the sparing directory includes an offset into the cache line indicating the location having the error.

15. The system of claim 13, wherein the sparing directory is within the controller.

16. The system of claim 13, wherein the sparing directory includes a plurality of entries storing data for locations in the cache lines for which errors are detected, wherein each of the entries indicates the address of the cache line having the location with the error, an offset indicating the location in the cache line having the error, and the data for the location.

17. A system, comprising:
a host
a host memory controller; and
at least one memory module coupled to the host memory controller to receive read and write requests from the host, each memory module comprising:
memory dies for storing data in cache lines; and
a controller that performs read and write operation with respect to the memory dies to:
in response to a write operation having write data for locations in one of the cache lines, write the write data for a location in the cache line having an error to an entry in a sparing directory including an address of the cache line;
read data from the cache line having the location with the error in response to a read operation to the cache line;
read substitute data for the location having the error in the cache line from the entry in the sparing directory for the cache line;
replace the data read at the location in the cache line having the error with the substitute data; and
returning the substitute data to the read operation.

18. The system of claim 17, wherein the controller in the memory module is further to:
write data to the locations in the cache line during the write operation; and
read data for locations in the cache line, wherein the data returned to the read operation includes the data read from the cache line for locations other than the location having the error and the substitute data.

19. The system of claim 18, wherein the controller in the memory module is further to:
perform error correction for the data read from the cache line including the substitute data in response to determining that the read data from the cache line including the substitute data includes an error; and
determine whether the error correction corrected the read data from the cache line including the substitute data, wherein the data read from the cache line including the substitute data is returned in response to the error correction correcting the error.

20. A method to perform read and write operations with respect to cache lines in memory dies, comprising:
in response to a write operation having write data for locations in a cache line perform:
detect an error at a location of the locations in the cache line;
write the write data to the cache line; and
writing a portion of the write data written to the location in the cache line having the error to an entry in a sparing directory, wherein the entry in the sparing directory further includes an address of the cache line having the error.

21. The method of claim 20, wherein there are multiple locations in the cache lines from which data can be stored in the sparing directory if there is an error at the locations, and wherein the entry in the sparing directory includes an offset into the cache line indicating the location having the error.

22. The method of claim 20, wherein the sparing directory includes a plurality of entries storing data for locations in the cache lines for which errors are detected, wherein each of the entries indicates the address of the cache line having the location with the error, an offset indicating the location in the cache line having the error, and the data for the location.

23. A method to perform read and write operations with respect to cache lines in memory dies, comprising:
in response to a write operation having write data for locations in one of the cache lines, writing the write data for a location in the cache line having an error to an entry in a sparing directory including an address of the cache line;
reading data from the cache line having the location with the error in response to a read operation to the cache line;
reading substitute data for the location having the error in the cache line from the entry in the sparing directory for the cache line;
replacing the data read at the location in the cache line having the error with the substitute data; and
returning the substitute data to the read operation.

24. The method of claim 23, further comprising:
writing data to the locations in the cache line during the write operation; and
reading data for locations in the cache line, wherein the data returned to the read operation includes the data read from the cache line for locations other than the location having the error and the substitute data.

25. The method of claim 24, further comprising:
performing error correction for the data read from the cache line including the substitute data in response to determining that the read data from the cache line including the substitute data includes an error; and
determining whether the error correction corrected the read data from the cache line including the substitute data, wherein the data read from the cache line including the substitute data is returned in response to the error correction correcting the error.

* * * * *